Feb. 20, 1923.
A. N. KOTARSKI.
NONSKIDDING CHAIN FOR VEHICLE WHEELS.
FILED APR. 29, 1922.
1,445,694.
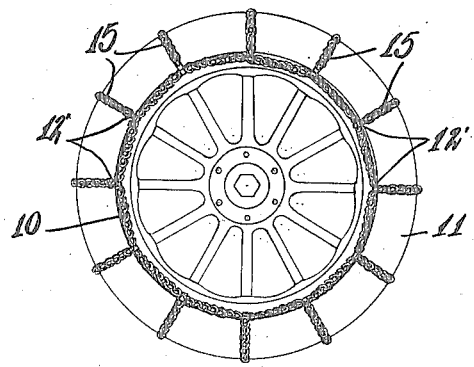
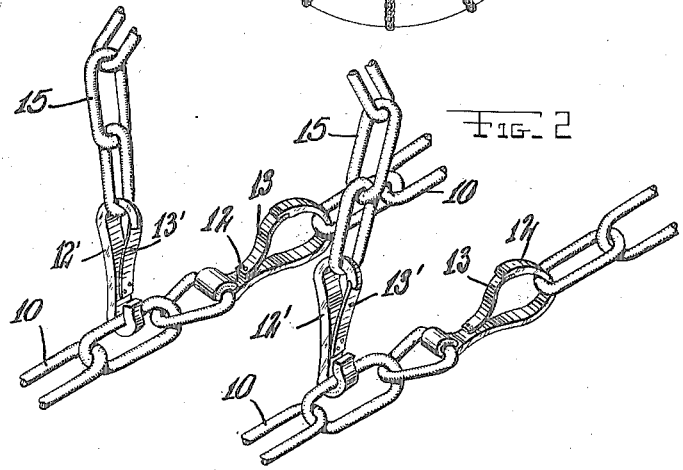
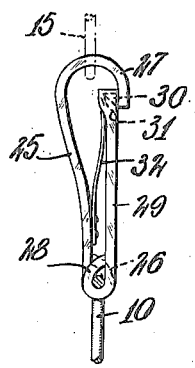
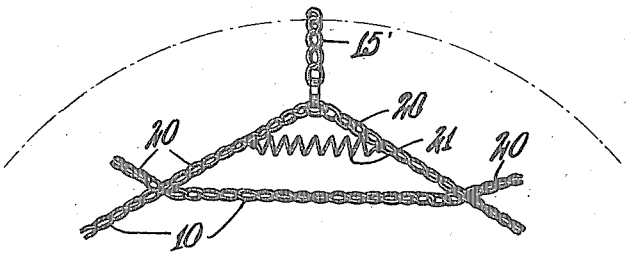
Inventor
Anthony N. Kotarski
By Gottard Polachek
Attorney Patented Feb. 20, 1923.

1,445,694

UNITED STATES PATENT OFFICE.

ANTHONY N. KOTARSKI, OF KINGSTON, PENNSYLVANIA.

NONSKIDDING CHAIN FOR VEHICLE WHEELS.

Application filed April 29, 1922. Serial No. 557,381.

*To all whom it may concern:*

Be it known that I, ANTHONY N. KOTARSKI, citizen of the United States, residing at Kingston, in the county of Luzerne and State of Pennsylvania, have invented certain new and useful Improvements in Nonskidding Chains for Vehicle Wheels, of which the following is a specification.

This invention relates to non-skid chains such as are used on automobile wheels to ensure a firm grip of the tire on slippery roads.

The invention has for a general object to provide a novel non-skid chain in which the sections which traverse the tire tread are made easily removable so as to permit of ready replacement when worn.

Other objects of the invention relate to the tensioning of the transverse sections and the provision of a novel form of attaching means.

For further comprehension of the invention, and of the objects and advantages thereof, reference will be had to the following description and accompanying drawings, and to the appended claim in which the various novel features of the invention are more particularly set forth.

Fig. 1 of the drawings is a face view of an automobile wheel provided with my improved non-skid chain applied thereto.

Fig. 2 is a fragmentary perspective view illustrating particularly the arrangement of the tire traversing members and the means by which they are attached to the annularly arranged members.

Fig. 3 is a fragmentary side view showing a modified arrangement of the chain.

Fig. 4 is a side view of a modified form of attaching hook.

In constructing my improved chain I provide two main lengths 10, which when the chain is applied to the wheel 11, extend in the form of annuli parallel to the wheel faces and one on each side of the wheel. To secure these chains in the form of annuli they have hooks 12 attached to one end and adapted to engage with the link at the opposite ends, these hooks having spring tongues 13 which prevent release thereof.

The tread traversing members or sections are indicated at 15 and may be joined to the main lengths by hooks 12', similar to the hooks 12, and provided with like spring tongues 13'.

In the arrangement shown in Fig. 3 each main length 10 has secured thereto the opposite ends of a series of short sections 20 which assume a triangular form as shown. The tread traversing members 15' connect detachably to these sections midway between the ends of the latter. Connected at opposite ends to the sections 20 at points between the centre and ends thereof, are coiled tension springs such as 21 which serve to keep all the parts under tension, and make the members 15' hug the tread of the tire.

In Fig. 4 I have shown a modified form of attaching hook which I may use and which comprises the shank 25 having a looped end 26 engaging the main chain element 10 and a hook 27 on its opposite end. Pivoted also on the chain element 10, by means of a pair of integral loops such as 28, is a tongue 29 in the form of a flat bar whose free end engages within the hook 27. Upon this hook 27 is a stud 30 which projects into a socket 31 in the tongue 29, the latter being held against the hook by a flat spring 32 secured at one end to the shank 25 and bearing at its opposite end against the free end of the tongue. As will be apparent the tongue 29 serves to reinforce the hook 27 against longitudinal strains, and is readily disengaged from the stud 30 for connection to the transverse member 15 by pressing it toward the shank 25.

As will be apparent, I have provided a simple and efficient form of non-skid chain which permits of ready replacing of worn sections and which serves to keep the tread traversing members in close contact with the latter.

Having thus described my invention what I claim as new and desire to protect by Letters Patent of the United States is as follows:

A non-skid chain for automobile wheels consisting of a pair of annularly arranged main lengths, each of said main lengths having a number of sections attached thereto at their ends, and tread traversing members removably attached to said sections midway between the ends of the latter, and tensioning means attached to said sections at points between the centre and ends of the latter to hold said tread traversing members in engagement with the tire tread.

In testimony whereof I have affixed my signature.

ANTHONY N. KOTARSKI.